G. KOMAREK.
CONVEYER PADDLE.
APPLICATION FILED MAY 24, 1920.

1,411,038. Patented Mar. 28, 1922.

Inventor
Gustav Komarek

UNITED STATES PATENT OFFICE.

GUSTAV KOMAREK, OF CHICAGO, ILLINOIS, ASSIGNOR, BY MESNE ASSIGNMENTS, TO MALCOLMSON ENGINEERING AND MACHINE CORPORATION, OF ST. LOUIS, MISSOURI, A CORPORATION OF MISSOURI.

CONVEYER PADDLE.

1,411,038. Specification of Letters Patent. Patented Mar. 28, 1922.

Application filed May 24, 1920. Serial No. 383,763.

*To all whom it may concern:*

Be it known that I, GUSTAV KOMAREK, a citizen of the United States, residing at Chicago, Illinois, have invented a certain new and useful Improvement in Conveyer Paddles, of which the following is a full, clear, and exact description, such as will enable others skilled in the art to which it appertains to make and use the same, reference being had to the accompanying drawings, forming part of this specification.

My invention relates generally to conveyers and more particularly to a paddle or flight that is mounted upon a shaft, and the latter being arranged for rotation in a conveyer trough and which flight or paddle is effective in moving material lengthwise of said trough.

The principal objects of my invention are, to generally improve upon and simplify the construction of the existing types of conveyer flights or paddles; to provide a flight which can be easily and cheaply produced; and to provide a flight having its arms or material engaging portions formed and disposed so as to engage and force the material lengthwise through the conveyer trough with the expenditure of comparatively little power.

With the foregoing and other objects in view, my invention consists in certain novel features of construction and arrangement of parts, hereinafter more fully described and claimed, and illustrated in the accompanying drawings, in which—

Figure 1:
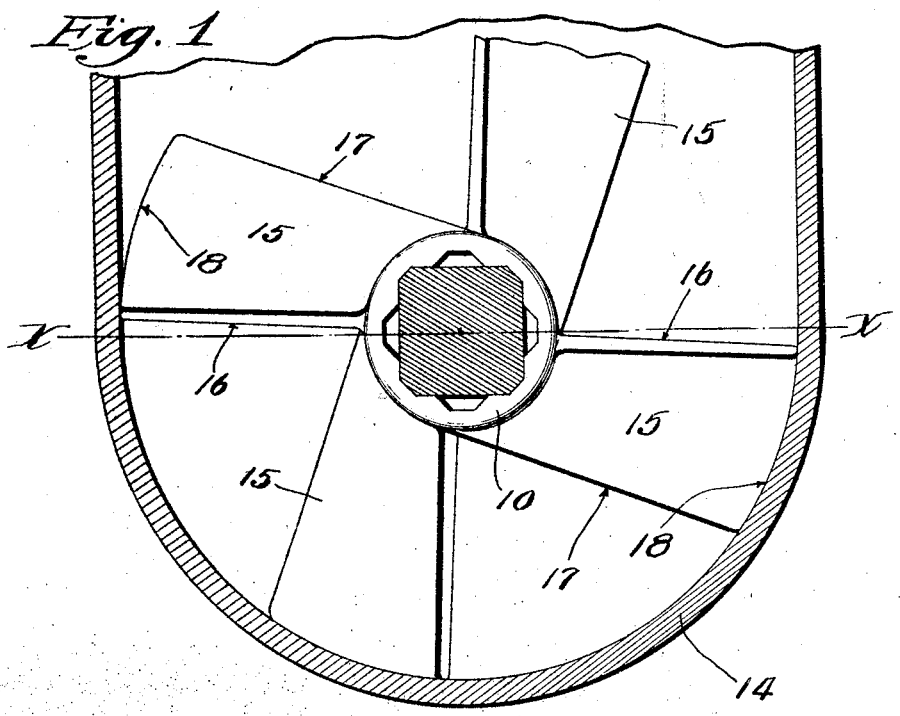
Figure 1 is a cross sectional view of a conveyer trough and showing a conveyer therein, the same being equipped with my improved paddles or flights.
Figure 2:
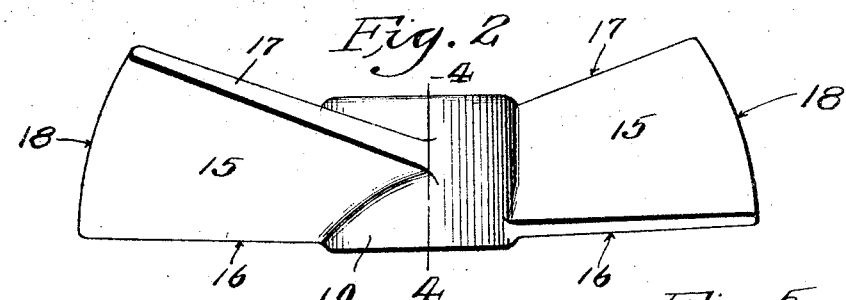
Figure 2 is a plan view of one of my improved conveyer paddles or flights.
Figure 3:
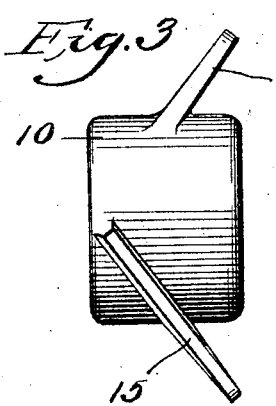
Figure 3 is an end elevational view of one of the flights or paddles.
Figure 4:
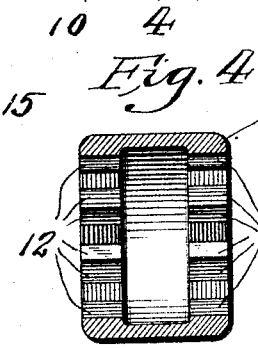
Figure 4 is an enlarged cross section taken approximately on the line 4—4 of Figure 2.
Figure 5:
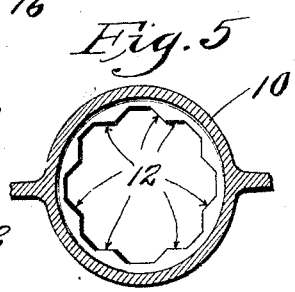
Figure 5 is a cross section taken approximately on the line 5—5 of Figure 4.

Referring by numerals to the accompanying drawings which illustrate a practical embodiment of my invention, 10 designates a hub, the opening in which is provided with angular faces such as 12 in order that said hub can be fitted onto an angular conveyer shaft such as 13, and said shaft being mounted for rotation in suitable bearings and longitudinally disposed within a conveyer trough such as 14.

It will be understood that a number of the hubs are located on the shaft 13 and thus as said shaft is rotated, the material fed or delivered into one end of the trough will be rapidly carried or conveyed to the discharge end or outlet of said trough.

Formed integral with or fixed to the hub 10 are oppositely disposed paddles or arms 15, each of the same lying in a single plane positioned at an angle of approximately thirty-seven and one-half degrees to the vertical plane of the face of hub 10. The front or forward edge 16 of each blade or paddle or that edge which first engages the material while the conveyer is in operation, is substantially parallel with and preferably slightly offset with respect to a line drawn through the axis of the shaft upon which the conveyer flight is mounted. The rear edge 17 of the arm or paddle occupies a plane tangent to the periphery of the hub 10 and the width of said arm or paddle gradually increases toward its outer end. The outer ends or edges 18 of the arms or paddles are formed on curves that are arcs of a circle concentric with the axis of the shaft to which the device is applied.

By virtue of the construction just described, each paddle or arm 15 occupies a position wholly to one side of a plane that intersects the axis of the hub 10 and which plane is parallel to the forward edges 16 of the arms or paddles. For instance, when one of the flights occupies the position as illustrated in Figure 1, with the forward edges 16 of the arms of the flight substantially parallel with a true horizontal plane or the line X—X, Figure 1, the entire body portion of one of the arms or paddles will occupy a position wholly above the line while the entire body portion of the other flight will be wholly positioned below the line.

In all the conveyer flights with which I am familiar, the arms or paddles are formed so that substantial portions thereof occupy positions on both sides of a line drawn through the axis of the shaft to which the flight is connected. I have observed that conveyers equipped with the types of flights just referred to require a great deal of power in their operation and when this form of conveyer becomes overloaded and stops as a result of the overload, it is practically impossible to again start the conveyer until the material in which the conveyer flights are embedded is removed.

Repeated tests and experiments have demonstrated the fact that where the arms or blades of a flight are formed with substantial portions on both sides of a plane intersecting the axis of the shaft that carries the flight, the forward edges and portions of said arms or blades being in advance of the axis intersecting plane develop considerable resistance in passing through the material within the conveyer trough, and, further, that this degree of resistance is greatly lessened where the forward edges of the arms or blades of the flight are disposed slightly to the rear of the axis intersecting plane.

My improved form of flight acts on the same principle as the generally used gooseneck tools, the cutting edges of which are disposed to the rear of the axis of said tools, and as distinguished from the older forms of planing tools wherein the cutting edges are disposed substantially forward of the axis or pivot. Further, I have in experiments demonstrated the fact that the ordinary forms of conveyer flights or those having substantial portions on both sides of an axis intersecting plane will "chatter" during operation and particularly while passing through relatively heavy material and that such objectionable results are entirely eliminated by the use of flights of my improved construction wherein the forward edges of the blades are in "lagging" positions, or disposed slightly to the rear of the axis intersecting plane.

While I have shown my improved flight formed with two blades or arms, it will be readily understood that the number of arms or blades can be increased or decreased in accordance with the work to be done. Further, flights constructed in accordance with my invention may be mounted on the shaft in different ways and instead of forming the arms or blades upon a hub that encircles the shaft, the inner ends of said blades may be provided with shaft engaging plates that are secured to the shaft with bolts or like fastening devices.

It will be readily understood that minor changes in the size, form and construction of the various parts of my improved conveyer flight may be made and substituted for those herein shown and described, without departing from the spirit of my invention, the scope of which is set forth in the appended claims.

I claim as my invention:

1. In a conveyer device, a hub, a plane flight disposed at an angle of approximately thirty-seven and one-half degrees to a plane perpendicular to the hub axis, the forward edge of said flight being disposed radially of said hub.

2. In a conveyer device, a hub, and a flight lying entirely in a single plane disposed diagonally to the axis of said hub, and having its forward edge in a straight line disposed at right angles to said axis.

3. In a conveyer device, a hub, and a flight lying entirely in a single plane disposed diagonally to the axis of said hub and having a straight forward edge extending substantially radially from said hub.

4. The combination with a conveyer shaft, of a flight secured thereto and lying in a single plane, the forward edge of which flight is straight and extends at right angles to the shaft axis, and the entire rear edge of said flight is straight and substantially tangent to the periphery of the flight hub.

5. The combination with a conveyer shaft, of a flight carried by said shaft, the entire body portion of which flight lies in a single plane is wholly disposed to the rear of a plane intersecting the axis of the shaft at right angles, the forward edge of said flight lying substantially parallel with the axis intersecting plane, and the rear edge of said flight being substantially tangent to the periphery of the hub.

6. A conveyer flight comprising a restricted hub, an inclined blade carried by said hub and lying in a single plane, the forward edge of which blade is disposed substantially at right angles to the axis of the hub, and the rear edge of said blade is disposed tangentially of the periphery of the hub.

7. A conveyer device comprising a hub and a pair of oppositely disposed blades projecting radially from said hub, the forward edges of said blades being substantially straight and at right angles to the axis of said hub, the rear edges of said blades being substantially straight, and the forward and rear edges of each blade diverging from each other toward the periphery of the blade.

8. A conveyer device comprising a restricted hub and a pair of oppositely disposed blades projecting radially from said hub, the forward edges of said blades being substantially straight and at right angles to the axis of said hub, and the rear edges of said blades being substantially straight and substantially tangent to the periphery of the hub.

9. In a conveyor flight, a hub of relatively small diameter and of substantial length, and a paddle lying in a single plane, disposed diagonally of the plane of the face of said hub and extending a substantial distance lengthwise of said hub and having its sides diverging from its connection with said hub to its periphery.

In testimony whereof I hereunto affix my signature this 19th day of May, 1920.

GUSTAV KOMAREK.